(12) United States Patent
Merlo (10) Patent No.: US 9,479,081 B2
(45) Date of Patent: Oct. 25, 2016

(54) SYSTEM FOR SUPPLYING A LOAD WITH A PARALLEL RESONANCE

(75) Inventor: Tiziano Merlo, San Pietro di Stabio (CH)

(73) Assignee: ADV TECHNOMIG SA, Paradiso (CH)

( * ) Notice: Subject to any disclaimer, the term of this patent is extended or adjusted under 35 U.S.C. 154(b) by 120 days.

(21) Appl. No.: 14/358,403

(22) PCT Filed: Nov. 15, 2011

(86) PCT No.: PCT/IB2011/055102
§ 371 (c)(1),
(2), (4) Date: May 15, 2014

(87) PCT Pub. No.: WO2013/072720
PCT Pub. Date: May 23, 2013

(65) Prior Publication Data
US 2014/0321183 A1 Oct. 30, 2014

(51) Int. Cl.
*H02M 3/335* (2006.01)
*H02M 7/537* (2006.01)
*H05B 33/08* (2006.01)

(52) U.S. Cl.
CPC ............. *H02M 7/537* (2013.01); *H05B 33/08* (2013.01); *Y02B 20/325* (2013.01)

(58) Field of Classification Search
CPC ...... H02M 7/537; H02M 3/28; H02M 3/335; H02M 3/33507; H02M 3/33528; H02M 3/33569; H02M 2007/4815; H02M 7/5381; H02M 7/53806; H02M 7/5155; H02M 7/5236; H05B 33/08; Y02B 70/1433; Y02B 70/1441
USPC .................... 363/15, 20, 21.02, 97, 134, 136
See application file for complete search history.

(56) References Cited

U.S. PATENT DOCUMENTS 5,144,203 A 9/1992 Fujita et al.
5,177,675 A * 1/1993 Archer ................ H02M 3/3372
363/134

(Continued)

FOREIGN PATENT DOCUMENTS

GB 2 379 098 2/2003
WO WO 86/05304 9/1986

(Continued)

OTHER PUBLICATIONS

Scollo, Fichera R.; "Electronic Transformer for a 12V Halogen Lamp"; AN528/0999; 4 pp.; http://www.st.com/st-web-ui/static/active/en/resource/technical/document/application_note/CD00003902.pdf; 1999.

(Continued)

*Primary Examiner* — Yemane Mehari
(74) *Attorney, Agent, or Firm* — Dorsey & Whitney LLP (57) ABSTRACT

A supply system for a load with a parallel resonance and comprising a transformer having a first and a second primary winding and a secondary winding, the secondary winding being directly connected to the load, which is essentially equivalent to a capacitor and a resistor in parallel, and having the function of a parallel resonant inductance. The supply system comprises a switching block connected to the transformer and including a first and a second switch respectively connected to the first and second primary windings and having respective control terminals connected to a first and second output terminal of a driving device adapted for driving the first and second switches in a complementary manner for obtaining an output voltage on the secondary winding having a sinusoidal pattern and a value determined on the basis of the capacitive value of the load and of the inductive value of the secondary winding.

20 Claims, 6 Drawing Sheets

(56) References Cited

U.S. PATENT DOCUMENTS

| | | | |
|---|---|---|---|
| 5,636,106 A * | 6/1997 | Batarseh | H02M 1/4208 |
| | | | 323/222 |
| 5,877,592 A | 3/1999 | Hesterman et al. | |
| 2004/0007991 A1 | 1/2004 | Ryu et al. | |
| 2005/0179406 A1 | 8/2005 | Harada et al. | |
| 2007/0228989 A1 | 10/2007 | Liang et al. | |
| 2014/0225439 A1 * | 8/2014 | Mao | H02M 3/3376 |
| | | | 307/31 |
| 2014/0321183 A1 * | 10/2014 | Merlo | H05B 33/08 |
| | | | 363/134 |

FOREIGN PATENT DOCUMENTS

| | | |
|---|---|---|
| WO | WO 97/13391 | 4/1997 |
| WO | WO 2012/090025 | 7/2012 |

OTHER PUBLICATIONS

Balranzade, Michael; "Electronic Lamp Ballast Design"; AN1543/D; 35 pp.; http://www.onsemi.com/pub_link/Collateral/AN1543-D.PDF; Jan. 2009—Rev. 1.

International Search Report from International Application No. PCT/IB2011/055102 mailed Jul. 24, 2012.

* cited by examiner

SYSTEM FOR SUPPLYING A LOAD WITH A PARALLEL RESONANCE

FIELD OF APPLICATION

The present invention relates to a system for supplying a load.

More specifically, the invention relates to a supply system with a parallel resonance and comprising at least one transformer having two primary windings and one secondary winding, the latter being directly connected to the load, which is essentially equivalent to a capacitor and a resistor in parallel, and having the function of a parallel resonant inductance.

In particular but not exclusively, the invention relates to a supply system of an electroluminescent cable of very large size, in particular length, and the following description is made with reference to this field of application only for simplifying the description thereof.

PRIOR ART

As it is known, an electroluminescent cable essentially comprises a first and a second conductor and a luminescent solid layer between the two conductors. For example, the conductors are metal wires suitably insulated from each other and the luminescent solid layer is a coating of luminescent material, solidified externally to the metal wire.

The first and second conductors may be electrically supplied, with inverted polarities of an alternating current AC, for generating an electromagnetic field therebetween. Such electromagnetic field is thus capable of energising the luminescent solid layer, allowing the cable to emit light in the visible range.

Usually, the luminescent solid layer of such electroluminescent cables is made by a process of drying a mixture based on the luminescent material and on a dielectric liquid; the mixture is subject to a thermal heating process or it is exposed to UV (Ultra Violet) rays, which solidify it around the conductor, generating the desired luminescent solid layer. The end portions of the conductors are stretched out or projecting from the solid layer, for being connected to respective polarities of an electric power supply device of an alternating current, and thus generate the electromagnetic field that allows the luminescent solid layer to emit light.

The electroluminescent cables thus obtained exhibit some drawbacks, which reflect in their light emissive capacity.

In particular, during the solidification of the mixture around the conductors in the luminescent solid layer, the molecular structure of the dielectric liquid and of the luminescent material at the basis of the mixture undergoes some alterations that reduce the capacity thereof of emitting light, in particular causing micro-cracks, that is, microscopic breaks and discontinuities in the luminescent solid layer. Moreover, the drying step of the corresponding production method is quite complex and has a long process, especially for making very long electroluminescent cables, that is, of several meters.

In order to obviate the drawbacks mentioned above relating to the cables comprising a luminescent solid layer obtained through a drying process, an electroluminescent cable having improved structural and lighting properties and a corresponding production method capable of considerably reducing the processing time and simplifying the production of the cable, especially in the case of very long cables, have been proposed in the International patent application (PCT) No. PCT/IB2010/056108, filed on 29 Dec. 2010 by the same Applicant.

In particular, in the cable described in the above PCT patent application, the luminescent solid layer of the known cables has been replaced with a luminescent gelatinous substance having a greater capacity of emitting light in the presence of an electromagnetic field, such gelatinous substance being associated to the conductors of the electroluminescent cable through a transparent plastic film. Such replacement allows considerably speeding up the cable production process, since a drying step is not required anymore, and it also prevents the alterations that such drying step would cause in the luminescent gelatinous substance.

Figure 1A:
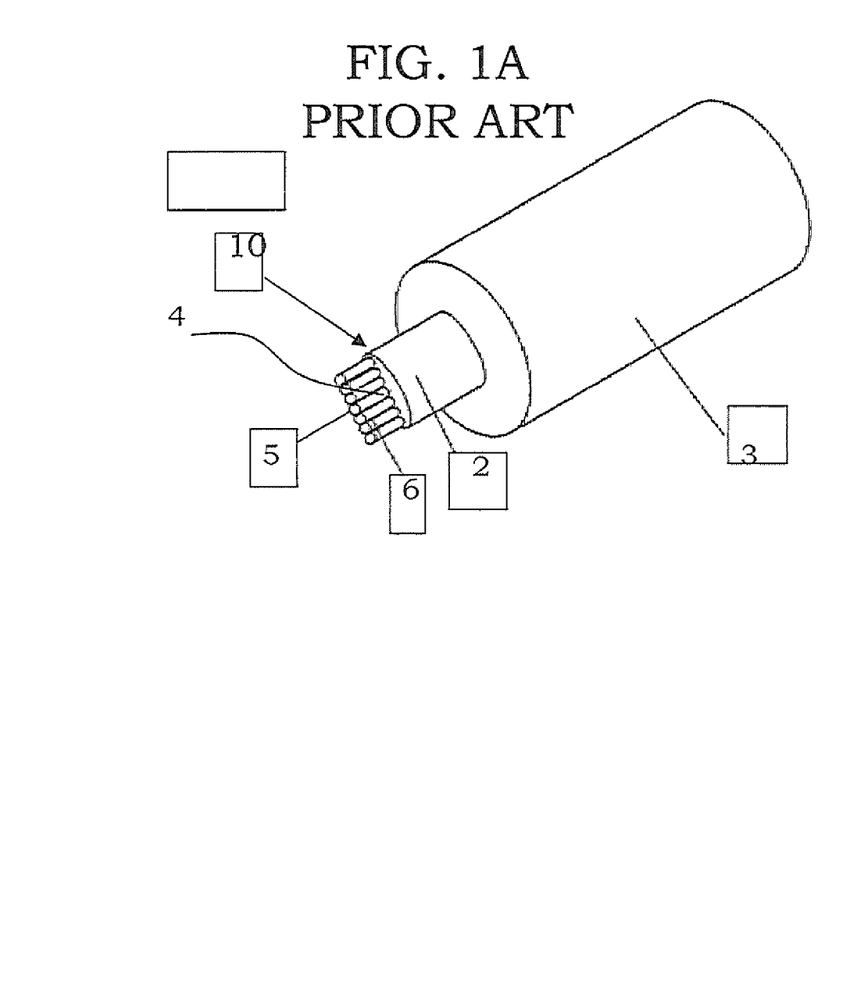
FIG. 1A schematically shows an electroluminescent cable made according to the prior art.

Such electroluminescent cable of this type is schematically shown in FIG. 1A, globally indicated with the reference numeral 10. The electroluminescent cable 10, with a substantially tubular shape in the example of the figure, comprises a transparent plastic film 2 coated by a protective layer 3, a luminescent gelatinous substance 4 enclosed by the film 2, and conductors 5 substantially embedded in the luminescent gelatinous substance 4. In particular, such conductors 5 are shaped as wires, optionally covered by a sheath 6.

As explained in the description text of the PCT application mentioned above, conductors 5 of the electroluminescent cable 10 are supplied by an alternating current AC and essentially act as a flat capacitor, thus generating an electric field that energises the luminescent gelatinous substance 4, which emits photons and thus light.

Figure 1B:
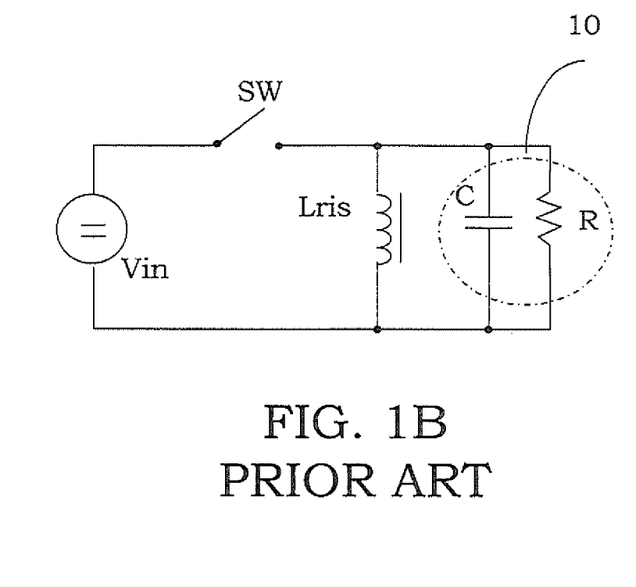
FIG. 1B shows an electric model of the cable of FIG. 1A.

An electric model of the electroluminescent cable 10 is shown in FIG. 1B. In particular, such model shows how the electroluminescent cable 10 is connected to the parallel of a capacitor C and of a resistor R, substantially an RC load. In order to measure the resonance frequency thereof, the electroluminescent cable 10, that is, the parallel between the capacitor C and the resistor R, is connected to the ends of a generator of a supply voltage Vin, directly, on the one end, and through the series of a resonance inductor Lris and of a switch SW, on the other end.

In particular, in the case of an electroluminescent cable having a length for example equal to 10 m, it is possible to verify that the equivalent capacity C of the cable is equal to 6 NF and its equivalent resistance R is equal to 15 KOhm.

In the practice, a very large sized electroluminescent cable, in particular having a length of a few meters, may only be powered with alternating currents having frequencies higher than 6-7 kHz. In fact, the electroluminescent cable emits light in the visible range in this way only. Moreover, such alternating currents should be of the sinusoidal type for preventing damages to the same cable, the behaviour whereof is essentially capacitive.

In the field of lighting, for supplying lamps and the like, it is known to use systems of the resonant type. Such systems provide a transformation from direct (mains) current (DC) for supplying an RC load and use the resonance principle for reducing losses on the same load.

For example, it is known to make such supply systems through transformers capable of supplying load variable powers at an output terminal, in particular for switching on the lamps connected thereto.

A transformer for halogen lamps is marketed for example by the company STMicroelectronics S.r.l. and described in the Application Note No. AN528/0999. An electronic ballast is also described in the Application Note No. 1543/D by ON Semiconductor.

The main problems related to the use of such known systems consist in the inability thereof of properly supplying an electroluminescent cable, in particular of considerable length. Such problems are mainly related to the voltage that the cable should receive and to the high operating frequency, in particular higher than 5 KHz.

The problem of the present invention is to provide a supply system, in particular for an electroluminescent cable even of considerable length, capable of simply and effectively carrying out a correct driving of such cable and of switching it on so as to emit light in the visible range, thus overcoming the drawbacks and the limitations that still affect the known systems.

SUMMARY OF THE INVENTION

The idea at the basis of the present invention is to provide a parallel resonance supply system comprising at least one transformer having two primary windings and one secondary winding, the latter being directly connected to the load, which is essentially equivalent to a capacitor and a resistor in parallel, and having the function of a parallel resonant inductance so as to provide a correct output voltage for switching on an electroluminescent cable.

In particular, a resonant supply system is proposed wherein the resonance is carried out so as to obtain reduced losses and the best load supply conditions, in particular the correct energisation of an electroluminescent cable.

Based on such solution idea, the technical problem is solved by a system for supplying a load, in particular an electroluminescent cable, with a parallel resonance and comprising at least one transformer having at least a first and a second primary winding and a secondary winding, such secondary winding being directly connected to the load with the function, in resonance, of an inductance in parallel to the same load, characterised in that it comprises a switching block connected to the transformer and including at least a first and a second switch respectively connected to such first and second primary windings and having respective control terminals connected to a first and a second output terminal of a driving device adapted for driving the first and second switches in a complementary manner for obtaining an output voltage on the secondary winding having a sinusoidal pattern and a value determined on the basis of the capacitive value of the load and of the inductive value of the secondary winding.

More in particular, the invention comprises the following additional and optional features, taken individually or in combination as needed.

According to one aspect of the invention, the driving device may comprise at least one driver block having a first and a second output terminal connected to the first and to the second output terminal of the driving device, as well as at least a first and a second input terminal connected to a switch-on block, in turn connected to a switch-on switch and being adapted for providing the first input terminal of said driver block with a first switch-on pulse and the second terminal of the driver block with a resonance holding signal.

According to another aspect of the invention, the driver block may further have a third input terminal connected to an evaluation block, in turn connected to a detection block for measuring the output voltage, such evaluation block receiving a value of the output voltage measured by the detection block and checking whether such value is positive or negative, that is, whether such output voltage is in the positive or negative half-wave of its sinusoidal pattern.

Moreover, according to one aspect of the invention, the driver block may have respective fourth, fifth and sixth input terminals connected to a first delay block, to a switch-off block and to a second delay block adapted for regulating the opening and closing of the switches of the switching block of the supply system for regulating the output voltage value based on the load.

According to another aspect of the invention, the switch-off block may have an input terminal connected to an output node of the detection block and receiving therefrom the output voltage value, the switch-off block checking the reaching of a maximum value of the output voltage for switching off the switches of the switching block.

According to yet another aspect of the invention, such first and second delay blocks may have respective input terminals connected to one another and to a further input terminal of the switch-off block, the first delay block introducing a first delay in the switching on of the first switch, and the second delay block introducing a second delay in the switching on of the second switch.

Moreover, the driver block may have a seventh input terminal connected to a current limiting block, in turn having an input terminal receiving a limiting voltage and being adapted for limiting a maximum current value supplied to the switches of the switching block.

According to another aspect of the invention, such first and second switches may comprise MOS transistors and the driving device may be connected to the gate terminals of the MOS transistors.

According to a further aspect of the invention, such first and second switches may comprise power MOS transistors with low resistance values in switch-on conditions.

Moreover, according to an aspect of the invention, the driver block may be inserted between a first and a second voltage reference, and it may comprise:
  a driver inserted between the voltage references and having a first and a second input as well as respective output terminals connected, through a first and a second output resistor, to such first and second output terminals,
  a first logic gate having a first input connected, through a first diode, to the first input terminal of the driver block, a second input connected to the seventh input terminal of the driver block and an output connected to the first input of the driver,
  a second logic gate having an output connected, through a second diode, to the first input of the first logic gate and respective inputs connected to the second and third input terminals of the driver block, and
  a third logic gate, in turn having respective inputs connected to one another and to the fourth input terminal of the driver block through a third diode and an output connected to a further input of the second logic gate.

According to such aspect of the invention, the driver block may further comprise the series of a fourth, a fifth and a sixth logic gate inserted between the third input terminal of the driver block and the second input terminal of the driver.

In particular, the fifth logic gate may have an input connected to the second input terminal of the driver block and the sixth logic gate may have an input connected to the second input of the first logic gate and to the seventh input terminal of the driver block.

Moreover, according to another aspect of the invention, the driver block may comprise the series of a seventh logic gate, of a diode and of an eighth logic gate inserted between a fifth input terminal of the driver block and a further input of the fifth logic gate.

According to yet another aspect of the invention, the driver block may comprise a further diode connected between a sixth input terminal thereof and an input of the eighth logic gate.

Moreover, according to another aspect of the invention, the driver block may comprise a further diode connected between its fifth input terminal and an input of the third logic gate.

According to one aspect of the invention, the switch-on block may comprise a ninth logic gate, a tenth logic gate and an eleventh logic gate, the ninth logic gate being connected, through a resistor, to the first input terminal of the driving device and thus to the switch-on switch as well as to an input of the tenth logic gate, the series of a resistor and of the eleventh logic gate being inserted between the ninth logic gate and a second input of the tenth logic gate in turn having an output connected, through a twelfth logic gate, to the first input terminal of the driver block.

Moreover, according to another aspect of the invention, the evaluation block may comprise a comparator connected to the second voltage reference and having inputs connected to the detection block.

According to a further aspect of the invention, such first and second delay blocks may respectively comprise the series of a diode and of a resistor inserted between an input terminal thereof and a first input of a comparator, in turn having a second input directly connected to the input terminal of the first and of the second delay block and an output connected, through a further resistor, to the fourth and to the sixth input terminal of the driver block, respectively.

The switch-off block may in turn comprise a first comparator having inputs connected to the first and second input terminals thereof and an output connected in feedback to an input and, through a resistor, to a first input of a second comparator, in turn having a second input connected to the second voltage reference and an output connected in feedback, by means of the parallel of a resistor and of a capacitor, to the first input thereof as well as to a first input of a third comparator, in turn having a second input connected to the second voltage reference and an output connected to the fifth input terminal of the driver block.

Finally, according to one aspect of the invention, the current limiting block may comprise a comparator, having a first input connected, through a resistor, to the input terminal thereof, receiving the limiting voltage, a second input connected to the second voltage reference and an output connected, through a further resistor, to the seventh input terminal of the driver block.

Further features and advantages of the supply system according to the present invention will appear more clearly from the following description, made by way of a non-limiting example with reference to the annexed drawings.

DETAILED DESCRIPTION

Figure 2:
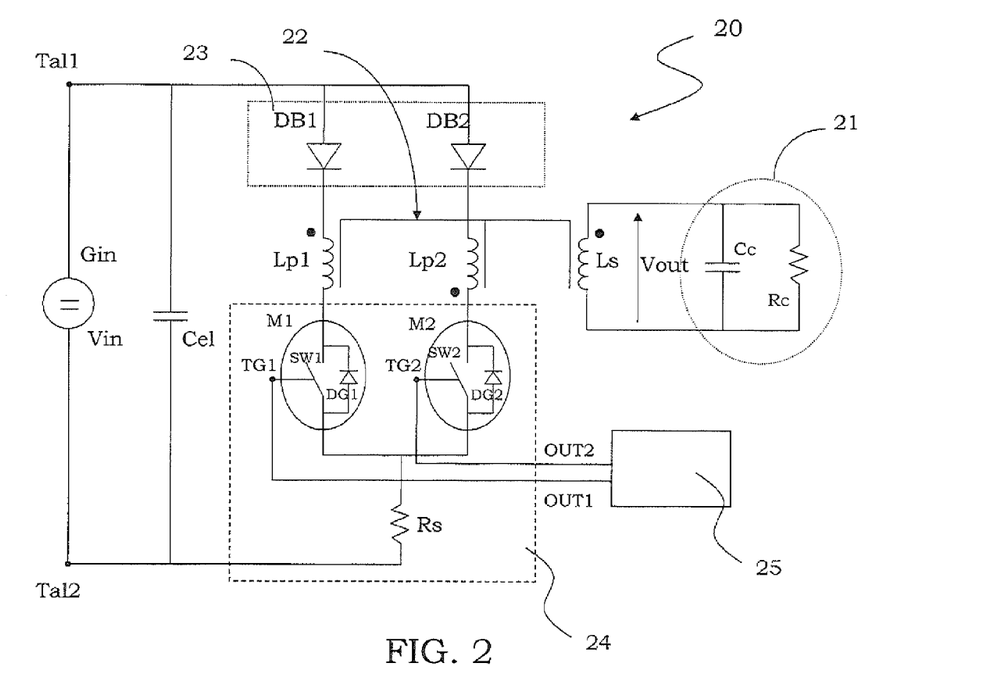
FIG. 2 schematically shows a supply system of an electroluminescent cable made according to the present invention.

With reference to FIG. 2 a supply system made according to the present invention is schematically shown and globally indicated with the reference numeral 20, the supply system being connected to at least one load 21, for example an electroluminescent cable, which in particular equals to the parallel of a capacitor Cc and of a resistor Rc, as explained above in relation to the prior art.

More in particular, the supply system 20 comprises at least one transformer 22 having a first primary winding Lp1, a second primary winding Lp2 and a secondary winding Ls, the latter being directly connected to load 21. The secondary winding Ls has the function, in resonance, of an inductance in parallel to the same load 21, in turn equivalent to the capacitor Cc in parallel to the resistor Rc.

The supply system 20 also comprises a decoupling block 23, inserted between a first supply terminal Tal1 of a generator Gin of an input or mains voltage Vin and the transformer 22, such input voltage Vin being for example a mains voltage at 48V DC. More in particular, the decoupling block 23 comprises at least a first and a second diode, DB1 and DB2, connected between the first supply terminal Tal and the first and second primary windings, Lp1 and Lp2, respectively.

Suitably, the supply system 20 also comprises a switching block 24, connected between a supply second terminal Tal2 of the generator Gin and the transformer 22. Moreover, a capacitor Cel is connected between the supply terminals, Tal1 and Tal2 of the generator Gin.

In particular, capacitor Cel is an electrolytic capacitor having the purpose of stabilising the input voltage Vin absorbing switching current peaks of the power supply device.

More in particular, the switching block 24 comprises at least a first and a second switch M1 and M2. In particular, such first and second switches, M1 and M2, may comprise a first and a second MOS transistor, schematised in the figure as the parallel of a diode, DM1 and DM2, and of a switch, SW1 and SW2. The switching block 24 further comprises a shunt resistor Rs connected between common terminals of the switches M1 and M2 and the second supply terminal Tal2 for controlling, in particular limiting, a maximum current value applicable to the transformer 22, to the decoupling block 23 and to the switching block 24, in particular to the transistors forming the switches M1 and M2 of the switching block 24, to the windings of the transformer 22 and to the diodes DB1 and DB2 of the decoupling block 23.

More in particular, the switches M1 and M2 of the switching block 24 are selected to as to have low resistance values in switch-on conditions, such resistance corresponding, in the considered case of switches made by MOS transistors, to the so-called RDSon, that is, the resistance that the transistor opposes to the passage of current between drain and source in closed condition (that is, upon switching on). In this way, in fact, the supply system 20 undergoes few losses during the switch-on step thereof. As it is well known by a technical expert in the field, the resistance value RDSon of the MOS transistors is selected as small as possible, compatibly with the requirements related to the quality and cost of the same component.

Moreover, it should be noted that the supply system 20 has minimal switching losses since the same occur at substantially null current, as shall be better explained in the following description.

To this end, the supply system 20 also comprises a driving device 25 connected to the switching block 24. In particular, the driving device 25 has at least a first and a second output terminal, OUT1 and OUT2, connected to respective control terminals of the switches M1 and M2 of the switching block 24, in particular gate terminals, TG1 and TG2, of the MOS transistors that realise such switches M1 and M2.

By regulating the operation of the switching block 24 and thus the current supplied to the transformer 22, the driving device 25 allows the supply system 20 to supply an output voltage Vout to the load 21 sufficient for ensuring the switching on thereof. In particular, in the case of a load 21 consisting of an electroluminescent cable, such output voltage Vout is regulated so as to equal to about 300 Vrms, equivalent to about 420V at peak.

It is further noted that the supply system 20 has a resonance frequency that depends on the inductance value of the secondary winding Ls of the transformer 22 and on the capacitive value Cc of the load 21, such capacitive value being, in the case of an electroluminescent cable, function of the length of the same cable. More in particular, advantageously according to the invention, the output voltage Vout is created on the secondary winding Ls, which is a resonance voltage that depends on the direct ratio of the transformer 22, the passage of energy being of the so-called "forward" type.

It should be noted that the primary portion of the transformer 22 is suitably divided into two parts, that is, into the first primary winding Lp1 and into the second primary winding Lp2, which besides increasing the output voltage value Vout, allows passing energy to the secondary winding Ls by a value equal to what required for keeping the system in resonance and supplying the load 21, in particular the resistive portion thereof.

The passage of energy to the load 21 occurs for each resonance half-wave and so as to have a sinusoidal current on the primary windings, Lp1 and Lp2, of the transformer 22, thus allowing the reduction of switching losses on the MOS transistors that realise such switches M1 and M2, which are power transistors, the switching being suitably carried out during the current passage at zero, as shall be better explained hereinafter.

The transformer 22 is thus sized so as to obtain the correct resonance frequency and the desired output voltage value Vout based on the capacitive load, therefore in the case of an electroluminescent cable, on the length of the cable connected to the same transformer. Moreover, the transformer 22 is sized so as to have a correct transformation ratio between an input voltage Vin, in particular the mains voltage at 48 Vdc, into a value of the output voltage Vout capable of switching on the load 21.

In a preferred embodiment, in the case of supply of an electroluminescent cable, the inductance value of the secondary winding Ls is calculated so as to have a resonance frequency equal to at least 10 kHz, so as to correctly switch on the electroluminescent cable and allow the emission of light in the visible range.

Considering such load 21 consisting of an electroluminescent cable having a length equal to 200 m, thus equal to a capacity Cc of 120 nF and a resistance Rc of 750 Ohm, it is immediate to see that the inductance value of the secondary winding Ls is equal to $Ls=1/((2\pi f)^2 \times Cc)=1/(2\pi 10 \text{ KHz})^2 \times 120 \text{ nF})=2.1$ mH. Since such cable should be supplied with a voltage equal to 420V at peak, the value of the transformation ratio of transformer 22 is also determined.

Figure 3:
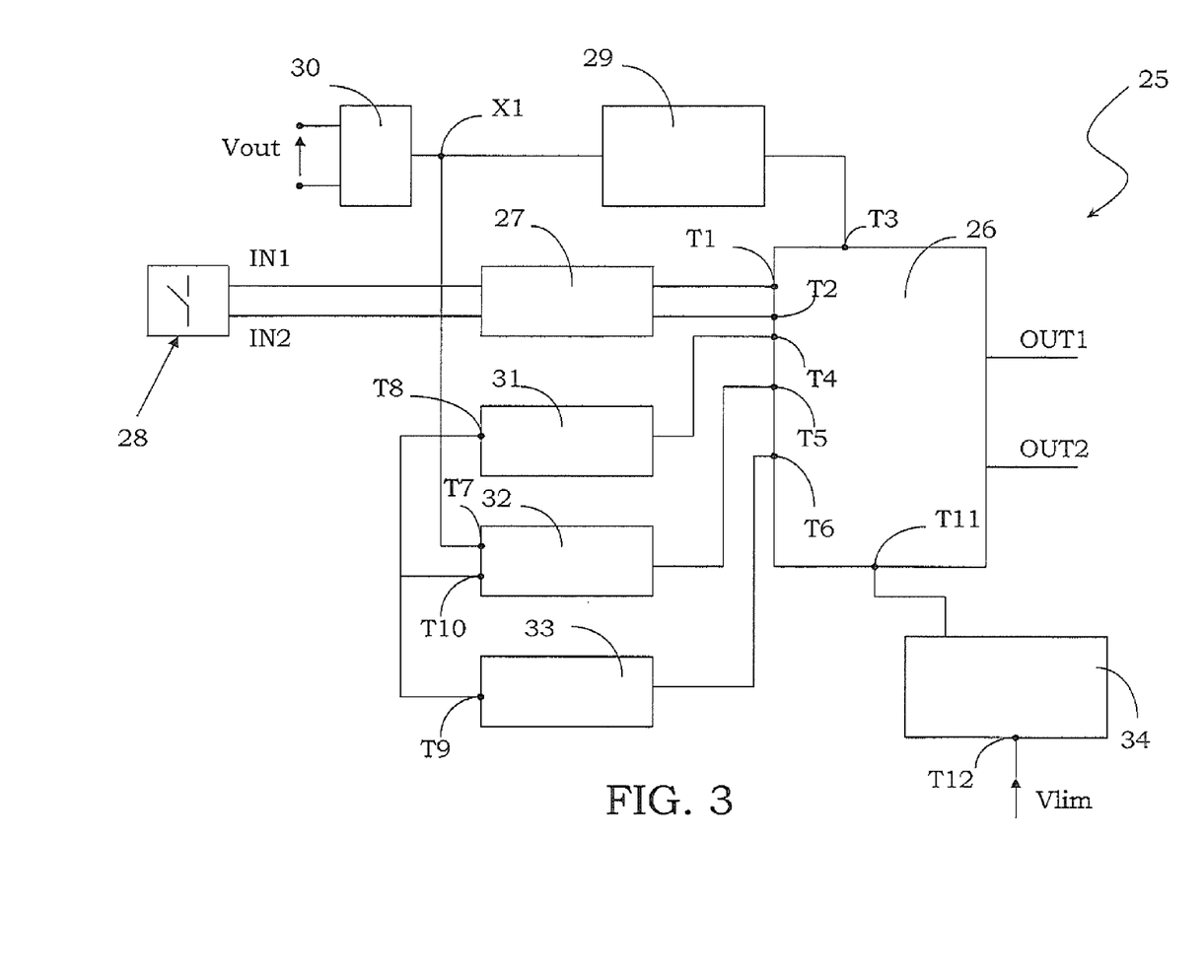
FIG. 3 schematically shows a driving device comprised in the supply system of FIG. 2.

More in detail, as schematically shown in FIG. 3, the driving device 25 comprises a driver block 26 having a first input terminal T1 and a second input terminal T2 connected to a switch-on block 27, as well as respective output terminals connected to the output terminals OUT1 and OUT2.

As already mentioned, the output terminals OUT1 and OUT2 of the driving device 25 are connected to the control terminals, TG1 and TG2, of the switches M1 and M2 of the switching block 24. The switch-on block 27 is in turn connected to a switch-on switch 28.

In particular, the switch-on block 27 provides a first switch-on pulse on the first terminal T1 and a resonance holding signal on the second terminal T2 of the driver block 26, subsequent to the closing of the switch-on switch 28, the driver block 26 in turn carrying out the actual driving of the switches M1 and M2 of the switching block 24 and thus switching on the driving device 25.

The driver block 26 further has a third input terminal T3 connected to an evaluation block 29, in turn connected to a block 30 for detecting the output voltage Vout in the supply system 20.

In this way, the detection block 30 measures the value of the output voltage Vout from the supply system 20 and provides it to the evaluation block 29 which checks whether such value is positive or negative, that is, whether the output voltage Vout of the supply system 20 is in the positive or negative half-wave of its sinusoidal pattern.

Moreover, the driver block 26 has a fourth input terminal T4 connected to a first delay block 31, a fifth input terminal T5 connected to a switch-off block 32 and a sixth input terminal T6 connected to a second delay block 33.

Moreover, the switch-off block 32 has an input terminal T7 connected to an output node X1 of the detection block 30 and receiving therefrom the value of the output voltage Vout, whereas the first and second delay blocks, 31 and 33, have respective input terminals, T8 and T9, connected to one another and to a further input terminal T10 of the switch-off block 32.

In particular, the switch-off block 32 checks the reaching of the maximum value of the output voltage Vout and switches off the switches M1 and M2 of the switching block 24. Moreover, the first delay block 31 introduces a first delay in the switching on of the first switch M1, and likewise the second delay block 33 introduces a second delay in the switching on of the second switch M2. In particular, the first and second delays may be equal to one another.

It should be noted that this delay upon switching on actually regulates the value of the output voltage Vout on the load, being a function of the connected load, indeed.

Finally, the driver block 26 has a seventh input terminal T11 connected to a current limiting block 34, in turn having an input terminal T12 receiving a limiting voltage Vlim.

In particular, the current limiting block 34 allows limiting the maximum current value supplied to switches M1 and M2 of the switching block 24, in terms of both maximum positive and maximum negative.

In essence, the operation of the driving device 25 according to the invention is as follows.

Starting from a condition wherein the value of the output voltage Vout is null, it closes the first switch M1 and allows a current value to cross the first primary winding Lp1, and to carry out the first resonance half-wave thanks to the secondary winding Ls, at the load 21, the consumption whereof is determined by the value of the resistor Rc.

When the output voltage value Vout, which corresponds to the voltage value on the secondary winding Ls, reaches a maximum positive value Vmax, as detected by the switch-off block 32, the driving device 25 turns off the first switch M1 and the output voltage Vout starts dropping sinusoidal-wise, thanks to the resonance mechanism.

Thereafter, when the output voltage value Vout reaches zero, the driving device 25 switches on the second switch M2, with a delay determined by the second delay block 33. In the practice, such delay allows regulating the value of the output voltage Vout. A current now flows into the second primary winding Lp2 and the output voltage Vout drops to negative values. When the output voltage value Vout reaches a maximum negative value −Vmax, the driving device 25 switches off the second switch M2 and the output voltage Vout starts rising again. When the output voltage value Vout reaches zero again, the driving device 25 switches the second switch M2 back on with a delay determined by the first delay block 31, and so on.

In this way, the driving device 25 allows obtaining a sinusoidal pattern for the output voltage Vout, with little deviations due to the switching on of the switches M1 and M2, which however do not affect the correct supply of the load 21, in particular an electroluminescent cable.

Figure 4A:
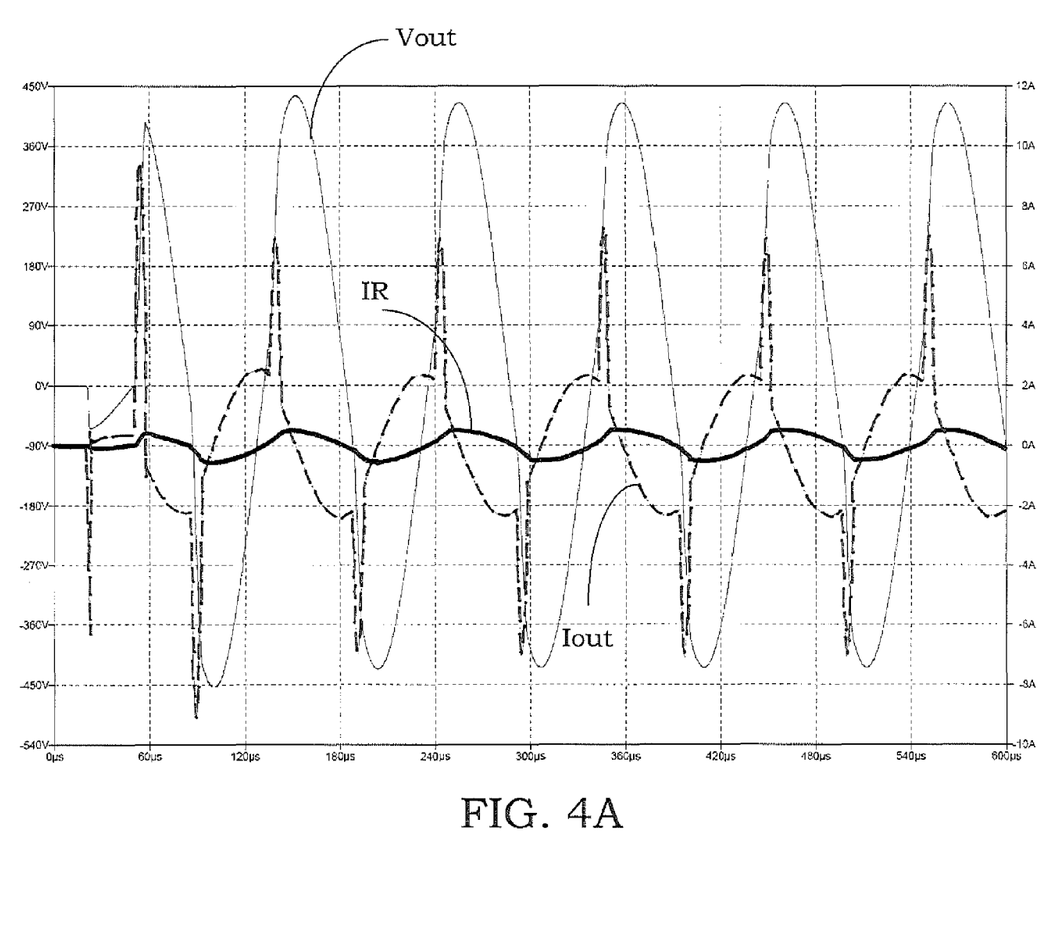
FIGS. 4A and 4B schematically show the patterns of signals within the supply system of FIG. 2 and the driving device of FIG. 3.
Figure 4B:
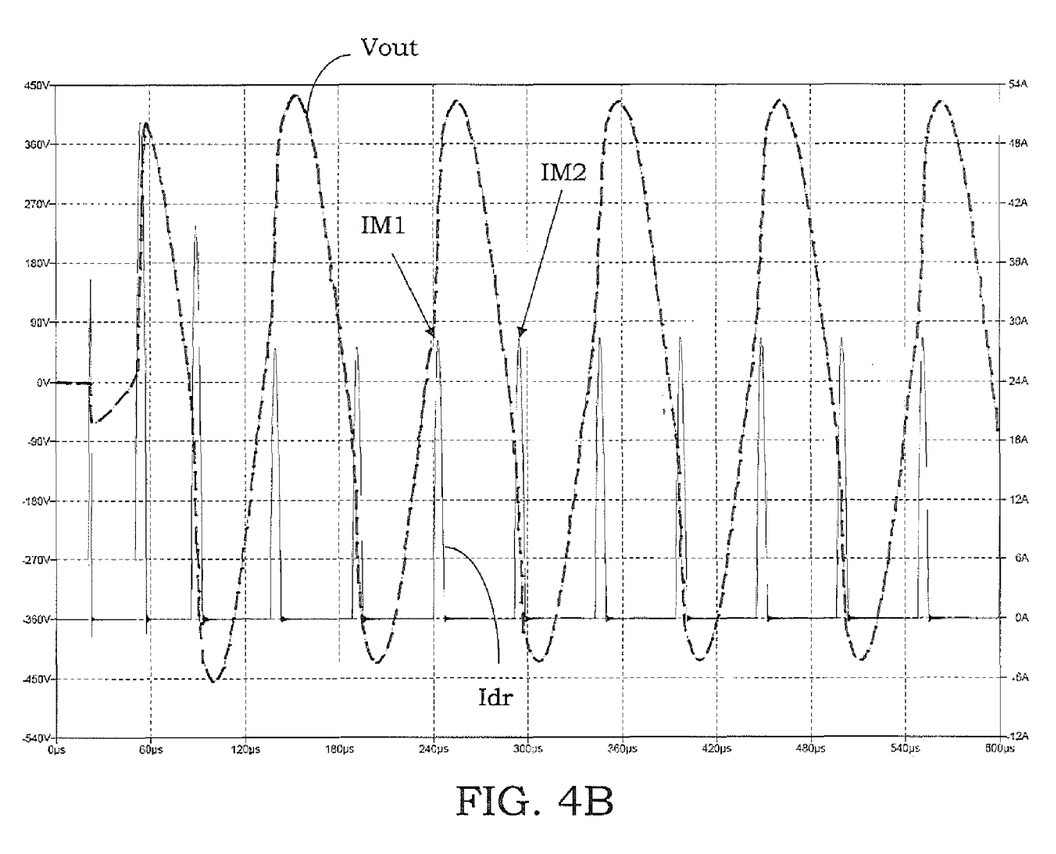

FIG. 4A shows by way of an example the patterns of the current Iout and of the output voltage Vout of the supply system 20 and IR that corresponds to the current that the resistive fraction of the load 21 absorbs and determines the output power of the power supply device, whereas FIG. 4B shows the patterns of the output voltage Vout of the supply system 20 and the current value IRs that flows into the shunt resistance Rs at the output of the switching block 24, with indication of the peaks IM1 and IM2 related to the closing of the switches M1 and M2.

Figure 5:
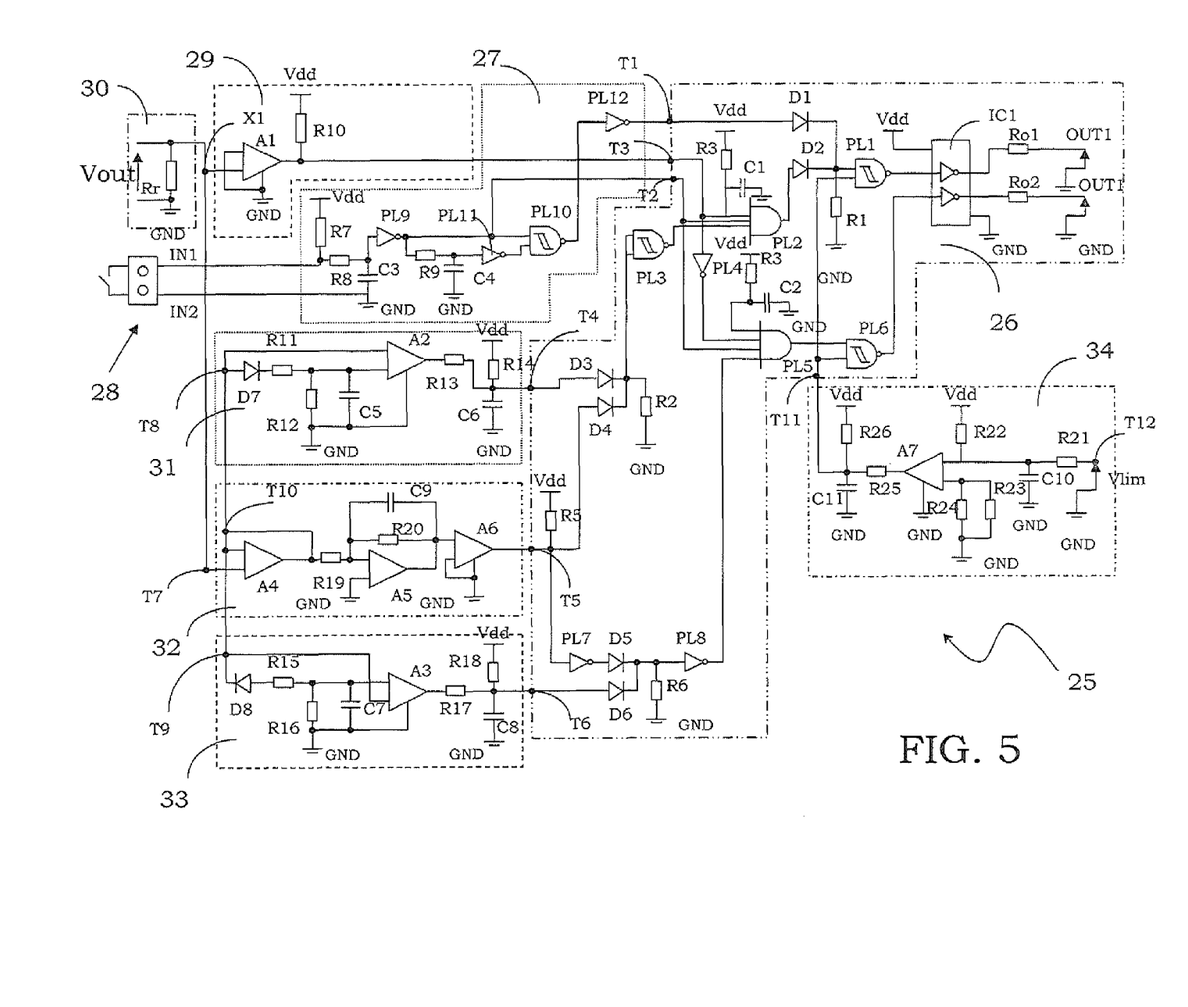
FIG. 5 shows a possible circuit embodiment of the driving device of FIG. 3.

More in detail, as shown in FIG. 5 in relation to a preferred exemplary embodiment of the driving device 25, the driver block 26 is inserted between a first and a second voltage reference, in particular a supply voltage reference Vdd and a ground GND, and it comprises a first diode D1, connected to the first input terminal T1 thereof as well as to a first input of a first logic gate PL1, in particular a hysteresis NAND gate, such first input further being connected to ground GND by a first resistor R1.

The first logic gate PL1 further has a second input connected to the seventh input terminal T11 of the driver block 26 as well as an output connected to a driver 101. The driver IC1 is in turn inserted between the supply voltage reference Vdd and ground GND and has respective output terminals connected, through a first and a second output resistor, Ro1 and Ro2, respectively to the first and to the second output terminal, OUT1 and OUT2, of the driving device 25. More in particular, such driver IC1 is an integrated circuit capable of driving (for switching on and off) the control terminal or gate of a component, usually starting from a low power signal.

The driver block 26 further comprises a second logic gate PL2, in particular of the multi-input AND type, having an output connected, through a second diode D2, to the input of the first logic gate PL1 and respective inputs connected to the second and to the third input terminal, T2 and T3, of the driver block 26 as well as to an output of a third logic gate PL3, in particular of the hysteresis NAND type, in turn having respective inputs connected to one another and to the fourth input terminal T4 of the driver block 26 through a third diode D3, as well as to the ground through a second resistor R2.

The first input of the second logic gate PL2 is further connected, through a fourth logic gate PL4, in particular of the NOT type, to an input of a fifth logic gate PL5, in particular of the multi-input AND type, whereas the second input of the second logic gate PL2 is further connected to the supply voltage reference Vdd through a third resistor R3 as well as to ground GND through a first capacitor C1.

The fifth logic gate PL5 has further inputs respectively connected to the supply voltage reference Vdd through a fourth resistor R4 and to ground GND through a second capacitor C2, as well as to the second input terminal T2 of the driver block 26 and to an output connected to an input of a sixth logic gate PL6, in particular of the hysteresis NAND type, in turn having a further input connected to the second input of the first logic gate PL1 as well as to the seventh input terminal T11 of the driver block 26 and to an output connected to a second input of the multiplexer IC1.

The driver block 26 further comprises a fourth diode D4 inserted between the fifth input terminal T5 thereof and the inputs of the second logic gate PL2. Such fifth input terminal T5 is further connected to the supply voltage reference Vdd through a fifth resistor R5 and to a further input of the fifth logic gate PL5 through the series of a seventh logic gate PL7, in particular of the NOT type, of a fifth diode D5 and of an eighth logic gate PL8, in particular always of the NOT type, the latter further having the input connected to ground GND through a sixth resistor and to the sixth input terminal T6 of the driver block 26 through a sixth diode D6.

Always with reference to the embodiment of FIG. 5, the switch-on block 27 in turn comprises a seventh resistor inserted between the supply voltage reference Vdd and the first input terminal IN1 of the driving device 25, in turn connected to a ninth logic gate PL9, in particular of the NOT type, through an eighth resistor, the input of such ninth logic gate PL9 being further connected to ground GND through a third capacitor C3. The output of such ninth logic gate PL9 is directly connected to a first input of a tenth logic gate PL10, in particular of the hysteresis NAND type, as well as to a second input thereof through the series of a ninth resistor R9 and of an eleventh logic gate PL11, in particular of the NOT type, interconnected by a fourth capacitor C4 that connects them to ground GND.

Moreover, the output of the tenth logic gate PL10 is connected, through a twelfth logic gate PL12, in particular of the NOT type, to the first input terminal T1 of the driver block 26.

The evaluation block 29, on the other hand, comprises a first comparator A1, in particular an operational amplifier connected to ground GND and having inputs connected to the detection block 30, simply represented by a resistor Rr for detecting the output voltage Vout, as well as an output connected to the supply voltage reference Vdd through a tenth resistor R10 and directly to the third input terminal T3 of the driver block 26.

The first delay block 31 comprises the series of a seventh diode D7 and of an eleventh resistor R11 inserted between the input terminal T8 thereof and a first input, in particular non inverting, of a second comparator A2, in particular an operational amplifier, having a second input, in particular inverting, directly connected to the input terminal T8 of the first delay block 31. The first input of such second comparator A2 is further connected to ground GND through the parallel of a twelfth resistor R12 and of a fifth capacitor C5. The second comparator A2 further has an output connected, through a thirteenth resistor R13, to the fourth input terminal T4 of the driver block 26, further connected to the supply voltage reference Vdd through a fourteenth resistor R14 and to ground GND through a sixth capacitor C6.

Likewise, the second delay block 33 comprises the series of an eighth diode D8 and of a fifteenth resistor R15 inserted between the input terminal T9 thereof and a first input, in particular inverting, of a third comparator A3, in particular an operational amplifier, having a second input, in particular non inverting, directly connected to the input terminal T9 of the second delay block 33. The first input of such third comparator A3 is further connected to ground GND through the parallel of a sixteenth resistor R16 and of a seventh capacitor C7. The third comparator A3 further has an output connected, through a seventeenth resistor R17, to the sixth input terminal T6 of the driver block 26, further connected to the supply voltage reference Vdd through an eighteenth resistor R18 and to ground GND through an eighth capacitor C8.

The switch-off block 32 in turn comprises a fourth comparator A4, in particular an operational amplifier, having inputs, in particular non inverting and inverting inputs, connected to its first and second input terminals, T7, T10, respectively. Such fourth comparator A4 has an output connected in feedback to the second input as well as, through a nineteenth resistor R19, to a first input, in particular inverting, of a fifth comparator A5, in particular an operational amplifier, in turn having a second input, in particular non inverting, connected to ground GND and an output connected in feedback, through the parallel of a twentieth resistor R20 and of a ninth capacitor C9, to the first input thereof as well as to a first input, in particular inverting, of a sixth comparator A6, in particular an operational amplifier, in turn having a second input, in particular non inverting, connected to ground and an output connected to the fifth input terminal T5 of the driver block 26.

Finally, the current limiting block 34 comprises a seventh comparator A7, in particular an operational amplifier, having a first input, in particular inverting, connected through a twenty-first resistor R21, to the input terminal T12 thereof, receiving the limiting voltage Vlim. Such first input is further connected to ground GND through a tenth capacitor C10, as well as to the supply voltage reference Vdd through a twenty-second resistor R22.

The seventh comparator A7 further has a second input, in particular non inverting, connected to ground GND through the parallel of a twenty-third and of a twenty-fourth resistor, R23 and R24, and an output connected, through a twenty-fifth resistor R25, to the seventh input terminal T11 of the driver block 26, such seventh input terminal T11 being further connected to the supply voltage reference Vdd through a twenty-sixth resistor R26 and to ground GND through an eleventh capacitor C11.

Of course, the embodiment of the driving device 25 according to the invention, described above with reference to FIG. 5, is provided by way of an example only, other embodiments being possible.

In essence, advantageously according to the invention, the supply system 20 supplies an output voltage Vout having a sinusoidal waveform with a suitable frequency, able to correctly supply a load 21. In particular, in the case of a load consisting of an electroluminescent cable, the supply system 20 ensures the correct switch-on thereof and the emission of light in the visible range.

In particular, such output voltage Vout is obtained using a driving device 25 for at least one pair of switches M1 and M2, in particular in the form of MOS transistors, of a switching block 24 of the supply system 20, such switches being connected to the primary windings of the transformer 22 and supplying a current thereto that is returned at the secondary winding Ls connected to the load 21 in resonance.

It is clear that a technical expert in the field may make several changes and variations to the supply system described above in order to meet specific and incidental needs, all falling within the scope of protection of the invention as defined by the following claims.

The invention claimed is:

1. A supply system for a load with a parallel resonance, the supply system comprising:
at least a transformer having at least a first and a second primary winding and a secondary winding, the secondary winding being directly connected to the load which is essentially equivalent to a capacitor and to a resistor in parallel, and having the function of a parallel resonant inductance;
a switching block connected to the transformer and including at least a first and a second switch respectively connected to the first and second primary windings and having respective control terminals connected to a first and a second output terminal of a driving device adapted for driving the first and second switches in a complementary manner for obtaining an output voltage on the secondary winding having a sinusoidal pattern and a value determined on the basis of a capacitive value of the load and of the inductive value of the secondary winding; and
a decoupling block including a first diode and a second diode, the first diode and the second diode connected between a first supply terminal of a generator of an input or mains voltage and the first and second primary windings, the first diode and the second diode positioned and configured to provide the sinusoidal pattern and limit a back current from the first and second switches;
wherein the load includes an electroluminescent cable.

2. The supply system according to claim 1, wherein the driving device includes at least one driver block having a first and a second output terminal connected to the first and second output terminals of the driving device, and at least a first and a second input terminal connected to a switch-on block, in turn connected to a switch-on switch and being adapted for providing the first input terminal of the driver block with a first switch-on pulse and the second terminal of the driver block with a resonance holding signal.

3. The supply system according to claim 1, wherein the first and second switches include MOS transistors and in that the driving device is connected to the gate terminals of the MOS transistors.

4. The supply system according to claim 1, wherein the first and second switches include power MOS transistors with low resistance values in switch-on conditions.

5. The supply system according to claim 2, wherein the driver block further includes a third input terminal connected to an evaluation block, in turn connected to a detection block for measuring the output voltage, the evaluation block receiving a value of the output voltage measured by the detection block and checking whether the output voltage is in the positive or negative half-wave of a sinusoidal pattern thereof.

6. The supply system according to claim 2, wherein the driver block includes respective fourth, fifth and sixth input terminals connected to a first delay block, to a switch-off block, and to a second delay block adapted for regulating the opening and closing of the switches of the switching block of the supply system for regulating the value of the output voltage based on the load.

7. The supply system according to claim 6, wherein the switch-off block includes an input terminal connected to an output node of the detection block and receiving therefrom the value of the output voltage, the switch-off block checking the reaching of a maximum value of the output voltage for switching off the switches of the switching block.

8. The supply system according to claim 7, wherein the first and second delay blocks include respective input terminals connected to one another and to a further input terminal of the switch-off block, the first delay block introducing a first delay in the switching on of the first switch, and the second delay block introducing a second delay in the switching on of the second switch.

9. The supply system according to claim 8, wherein the driver block includes a seventh input terminal connected to a current limiting block, in turn having an input terminal receiving a limiting voltage and being adapted for limiting a maximum current value supplied to the switches of the switching block.

10. The supply system according to claim 9, wherein the driver block is inserted between a first and a second voltage reference, and wherein the driver block includes:
a driver inserted between the voltage references and having a first and a second input, and respective output terminals connected, through a first and a second output resistor, to the first and second output terminal;
a first logic gate having a first input connected, through a first diode of the driver block, to the first input terminal of the driver block, a second input connected to the seventh input terminal of the driver block, and an output connected to the first input of the driver;
a second logic gate having an output connected, through a second diode of the driver block, to the first input of the first logic gate, and respective inputs connected to the second and third input terminals of the driver block; and
a third logic gate, in turn having respective inputs connected to one another and to the fourth input terminal of the driver block through a third diode and an output connected to a further input of the second logic gate.

11. The supply system according to claim 10, wherein the driver block further includes the series of a fourth, a fifth and a sixth logic gate inserted between the third input terminal of the driver block and the second input terminal of the driver.

12. The supply system according to claim 11, wherein the fifth logic gate includes an input connected to the second input terminal of the driver block and the sixth logic gate has an input connected to the second input of the first logic gate and to the seventh input terminal of the driver block.

13. The supply system according to claim 12, wherein the driver block includes the series of a seventh logic gate, of a diode and of an eighth logic gate inserted between a fifth input terminal of the driver block and a further input of the fifth logic gate.

14. The supply system according to claim 13, wherein the driver block includes a further diode connected between a sixth input terminal thereof and an input of the eighth logic gate.

15. The supply system according to claim 13, wherein the driver block includes a further diode connected between the fifth input terminal thereof and an input of the third logic gate.

16. The supply system according to claim 14, wherein the switch-on block includes a ninth logic gate, a tenth logic gate, and an eleventh logic gate, the ninth logic gate being connected, through a resistor, to the first input terminal of the driving device and to the switch-on switch as well as to an input of the tenth logic gate, the series of a resistor and of the eleventh logic gate being inserted between the ninth logic gate and a second input of the tenth logic gate in turn having an output connected, through a twelfth logic gate, to the first input terminal of the driver block.

17. The supply system according to claim 16, wherein the evaluation block includes a comparator connected to the second voltage reference and having inputs connected to the detection block.

18. The supply system according to claim 16, wherein the first and second delay blocks respectively include the series of a diode and of a resistor inserted between an input terminal thereof and a first input of a comparator, in turn having a second input directly connected to the input terminal of the first and second delay blocks and an output connected, through a further resistor, to the fourth and sixth input terminals of the driver block, respectively.

19. The supply system according to claim 16, wherein the switch-off block in turn includes a first comparator having inputs connected to the first and second input terminals thereof and an output connected in feedback to an input and, through a resistor, to a first input of a second comparator, in turn having a second input connected to the second voltage reference and an output connected in feedback, by means of the parallel of a resistor and of a capacitor, to the first input thereof as well as to a first input of a third comparator, in turn having a second input connected to the second voltage reference and an output connected to the fifth input terminal of the driver block.

20. The supply system according to claim 16, wherein the current limiting block includes a comparator, having a first input connected, through a resistor, to the input terminal thereof, receiving the limiting voltage, a second input connected to the second voltage reference and an output connected, through a further resistor, to the seventh input terminal of the driver block.

* * * * *